United States Patent [19]  
Hardenbrook et al.

[11] 3,898,001  
[45] Aug. 5, 1975

[54] ELECTROMETER SYSTEM FOR NON-CONTACT DETECTION OF ELECTROSTATIC CHARGE ON A MOVING ELECTROSTATOGRAPHIC IMAGING SURFACE

[75] Inventors: James M. Hardenbrook, Columbus; Paul G. Andrus, Powell, both of Ohio

[73] Assignee: Xerox Corporation, Stamford, Conn.

[22] Filed: Mar. 28, 1974

[21] Appl. No.: 455,771

Related U.S. Application Data

[62] Division of Ser. No. 388,505, Aug. 14, 1973, Pat. No. 3,852,668.

[52] U.S. Cl. ................... 355/3 R; 118/637; 324/72
[51] Int. Cl. ........................................... G03g 15/00
[58] Field of Search ................. 355/3 R, 3 DD, 14; 118/637; 324/72

[56] References Cited
UNITED STATES PATENTS

| 3,406,334 | 10/1968 | Marquart et al. | 324/72 X |
| 3,611,982 | 10/1971 | Coriale et al. | 118/637 X |
| 3,774,108 | 11/1973 | Ogilvie | 324/72 |

*Primary Examiner*—Richard L. Moss

[57] ABSTRACT

A simple electrometer system particularly adapted for non-contact measurement of electrostatic charges in electrostatography, such as the charge level on photoreceptor surface areas in commercial xerographic machines. Structure for readily mounting the electrometer as a desired measurement position immediately prior to image development in such machines is disclosed. Stable, long term and very high resistance induced electrostatic charge retention and accurate measurement thereof is provided by a simple disclosed electrometer circuit utilizing only a few commercially available electronic components including a single semi-conductive active element. The circuit output can be read by a conventional test meter, or utilized for various machine controls. The electrometer is controlled by a simple rotary switching arrangement.

7 Claims, 8 Drawing Figures

ELECTROMETER SYSTEM FOR NON-CONTACT DETECTION OF ELECTROSTATIC CHARGE ON A MOVING ELECTROSTATOGRAPHIC IMAGING SURFACE

This is a division of application Ser. No. 388,505, now U.S. Pat. No. 3,852,668, filed Aug. 14, 1973.

This invention relates to electrometers, and more particularly to electrometer systems measuring electrostatic charges in electrostatography.

The use of electrometers in electrostatography is known in the patent literature, including the use of electrometers to measure photoreceptor surface charges in xerography after charging and/or exposure. The major advantage of an electrometer measurement of the imaging surface in an electrostatographic system is that it provides a direct measurement of the charge actually on a specific surface area at the time that surface area passes the electrometer probe. Thus, in xerography, by locating the probe after the imaging station, it can provide a measurement of the actual "background" charge level remaining on the photoreceptor surface. This background level can be quite critical for good copy quality, and is preferably measured just prior to the latent image entering the developer station (for electrostatic development of the latent image into a visible toner image).

In spite of this known advantage of electrometers, the charge applied to a xerographic photoconductor from a corotron or other charging device at the charging station is still commonly measured indirectly in the field by measuring the current applied to a grounded metal shoe substituted for the photoreceptor surface. However, this at best provides only an indirect indication of the initial charge applied to the surface of the photoreceptor. During the time period in which the photoreceptor surface travels from the charging station over to the developer station there is a loss of this initial charge due to "dark decay." Dark decay is a characteristic of the photoreceptor causing the loss of apparent surface voltage in the absence of light. This dark decay charge conduction is a particular problem with certain modern high-speed or high sensitivity photoconductive materials in xerography. The problem is aggrevated by the fact that the dark decay rate is not constant, but rather varies with age and with changes in ambient conditions such as temperature and humidity. Thus, even in dark image areas or dark interdocument areas which are not light exposed in the exposure station, the photoreceptor surface charge remaining in these areas will be less than the initial charge therein by some variable amount due to dark decay. This drop in voltage can be measured by an electrometer at any desired location.

As noted above, an electrometer can measure the remaining, or "background" charge on the photoreceptor remaining after exposure in the non-image or otherwise fully exposed areas. The control of this background voltage level is important for proper development and copy quality, including control of the undesirable deposit of toner in such background areas. An electrometer can provide an accurate measurement of the actual background voltage level just prior to development by location of the electrometer probe adjacent the developer station.

The above-described advantages of direct electrometer charge measurement of a photoreceptor surface charge in xerography after initial charging or before development are known in the art, as early exemplified by U.S. Pat. Nos. 2,781,705, issued Feb. 19, 1957, to H. E. Crumline, et al.; 2,852,651, issued Sept. 16, 1958, to H. E. Crumline, et al.; 2,956,487, issued Oct. 18, 1960, to E. C. Giamo, Jr.; 3,013,203, issued Dec. 12, 1961, to W. M. Allen, et al.; 3,068,356, issued Dec. 11, 1962, to J. J. Codichini; 3,321,307, issued May 23, 1967, to F. Urbach; 3,406,334, issued Oct. 15, 1968, to V. L. Marquart, et al.; 3,438,705, issued Apr. 15, 1969, to P. F. King; 3,611,982, issued Oct. 12, 1971, to S. Coriale; 3,654,893, issued Apr. 11, 1972, to D. E. Piper, et al.; and 3,674,353, issued July 4, 1972, to W. Tractenberg.

The above and other efforts in commercial, rather than laboratory, applications of electrometers to electrostatography have, as a practical matter, been hampered by the high cost and complexity or instability of the electrometer systems. Most such systems have required choppers or vibrating probes and expensive high voltage amplifier and feedback circuits, even though the above patents illustrate the highly developed nature of this art.

As noted in *Xerography*, infra, p. 213:

"The measurement of the surface potential of the charged photoconductor is a necessary instrumentation requirement of xerography. All methods used are variations of techniques to determine the potential induced on a probe placed above the charged surface to be measured, and to determine the absolute value by calibration. That is, the plate potential, or the potential of the surface, is measured by a probe and an electrometer or electrostatic voltmeter.

"A simple form of usable electrometer is a direct current type using a triode or a space charge grid tetrode electrometer tube for current amplification. In a circuit of this type, the probe is mounted within a grounded shield and is connected directly to the grid of the tube. The sensitivity of such an electrometer is a function of the ratio of the capacity of the probe to the xerographic surface, and of the probe and grid to the ground and the other elements in the electrometer tube. Such direct current electrometers and very reliable and sensitive, but they differ from changes in sensitivity due to spacing, and from drift, although the latter can be reduced by using a balanced circuit. Such an instrument can be independent of spacing by applying a nulling voltage to the base of the plate, and reading this voltage.

"Several types of alternating current devices can also be used. A relatively simple form is a rotating vane type in which a butterfly-shaped shield or chopper rotates between a butterfly-shaped probe and the charged surface. The alternating current signal is amplified and rectified for sensing by a direct-current meter. Such instruments, while more stable than the dc types, are also sensitive to spacing and cannot be converted to a null type of system in this simple form.

"More complex electrometer circuits can provide both drift-free and spacing-insensitive measurements. One such device consists of two units, a detector preamplifier probe and a main amplifier probe and a main amplifier which includes an indicating meter and recorder output."

Recent relevant examples of the direct current type of electrometer discussed above may be seen in U.S. Pat. Nos. 3,370,225, issued Feb. 20, 1968, to R. P. H. Winder and 3,449,668, issued June 10, 1969, to L. L. Blackwell, et al.

The present invention overcomes the above-discussed and other problems and provides an electrometer system which is extremely simple and low cost, yet rugged, accurate, very stable, and easy to use in the field by regular technicians and repair personnel.

An exemplary embodiment of the present invention is shown and described hereinbelow as incorporated in an otherwise conventional exemplary xerographic apparatus and process. Accordingly, said xerographic process and apparatus need not be described in detail herein, since various printed publications and patents and publicly used machines are available which teach details of various suitable exemplary electrophotographic structures, materials and functions to those skilled in the art. Some examples are disclosed in the books *Electrophotography* by R. M. Schaffert, and *Xerography and Related Processes* by John H. Dessauer and Harold E. Clark, both first published in 1965, by Focal Press Ltd., London, England. Pages 99–100 and 213–216 of *Electrophotography* relate specifically to electrometers. All of these and other references cited herein are hereby incorporated by reference in this specification.

Further objects, features and advantages of the present invention pertain to the particular apparatus, steps and details whereby the above-mentioned aspects of the invention are attained. Accordingly, the invention will be better understood by reference to the following description and to the drawings forming a part thereof, which are substantially to scale other than in the schematic views, and wherein.

Figure 1:
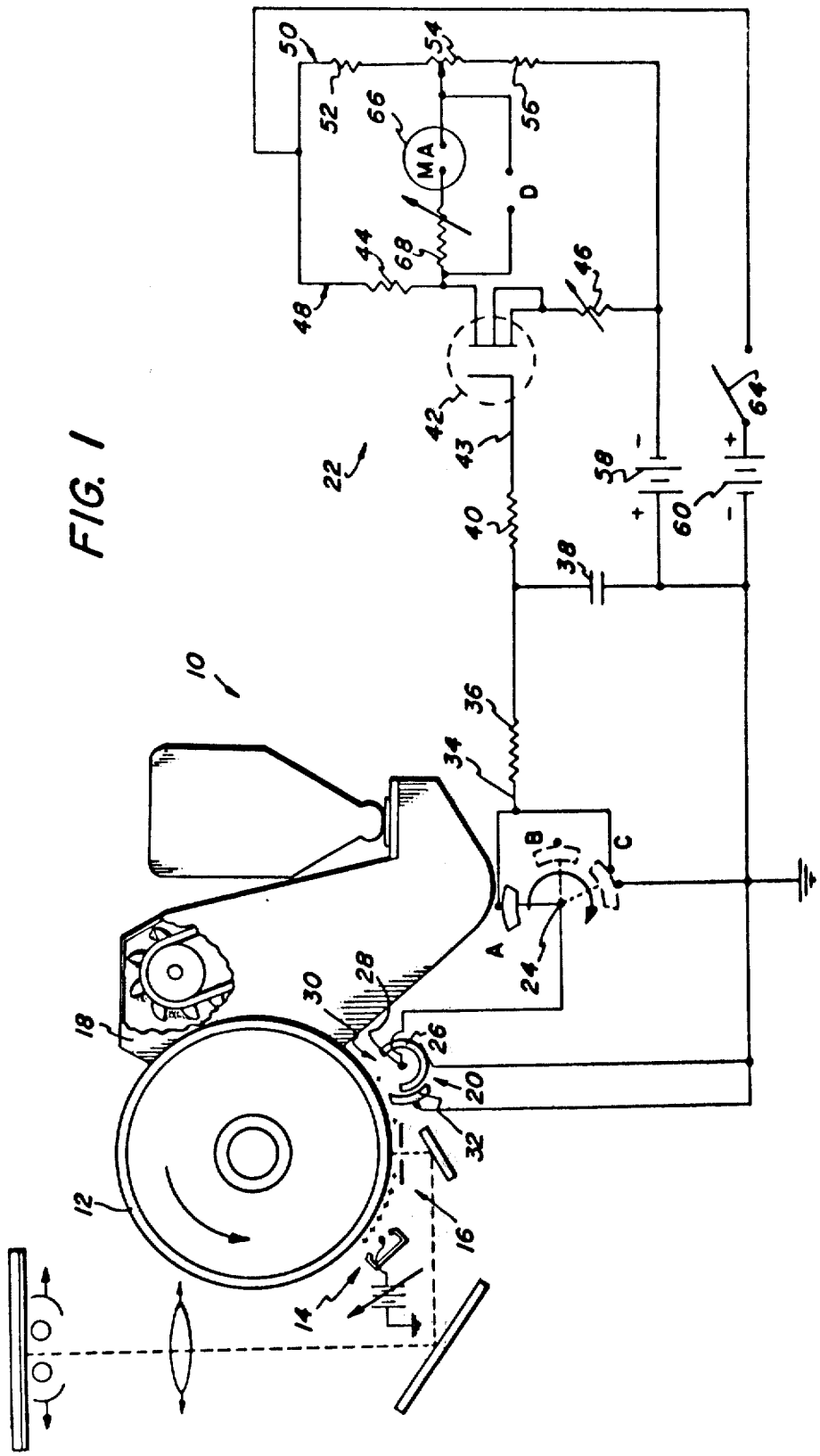
FIG. 1 is a schematic view of an exemplary electrometer system in accordance with the present invention.

Referring now to the drawings, FIGS. 1 through 8, there is shown therein an exemplary electrometer system 10 in accordance with the present invention utilized in measuring the charge on an imaging surface in an otherwise conventional electrostatographic system. Referring first to FIG. 1, the complete electrostatographic electrometer system 10 is shown in schematic form, including both a circuit diagram as well as associated related portions of an exemplary conventional xerographic system. For clarity, only these components of the xerographic system related to the following discussion of this electrometer system are illustrated. Suitable further details are readily available from the references cited herein.

In this connection, it will be noted that the particular xerographic system to which the electrometer system of the invention is shown incorporated in this preferred embodiment is that of the Xerox "4000" copier. The details of the "4000" machine system are well known to those skilled in the art due to their worldwide commercial distribution for several years in large numbers. With the "4000" copier, as will be discussed in more detail herein, the electrometers system 10 is desirably mounted in the existing mounting rails of the inter-document (pitch fade-out) electroluminescent panel by the structure shown especially in FIGS. 7 and 8. This existing pair of mounting rails in the "4000" machine is located after the charging and exposure station and prior to the development station in the path of the photoconductive drum, in the position shown in FIG. 1.

In the schematic embodiment of FIG. 1, for simplification, the details of the electrometer mounting and the probe structure are not shown. These details are illustrated in the other Figures. FIG. 1 schematically illustrates a conventional photoconductive drum 12, the imaging surface of which is first charged at a conventional charging station 14, image exposed in an image station 16, and then the electrostatic latent image is developed in a developer station 18. Positioned adjacent the developer station 18 there is schematically illustrated the electrometer probe 20 and the connecting electrometer circuitry 22. It may be seen that the probe 22 is schematically connected to the electrometer circuitry 22 through a three position switch 24. The probe 20 here comprises a grounded probe shield 26 and a probe electrode 28 therein. The probe electrode 28 senses the charge on the surface of the photoconductive drum 12 through a probe window 30 in the probe shield 26. This probe window 30 is coverable by a grounded shutter 32. This is accomplished here by rotation of the probe shield 26 so that its window aperture 30 rotates under the shutter 32. The tubular probe shield 26 is rotatable within a concentric slightly larger conductive outer tube 31 forming the shutter 32. As may be seen particularly from FIGS. 4–6, the probe electrode 28 here is an insulatively supported stationary conductive wire extending coaxially through the probe shield 26, which is a hollow elongated cylindrical tubular conductor.

Figure 2:
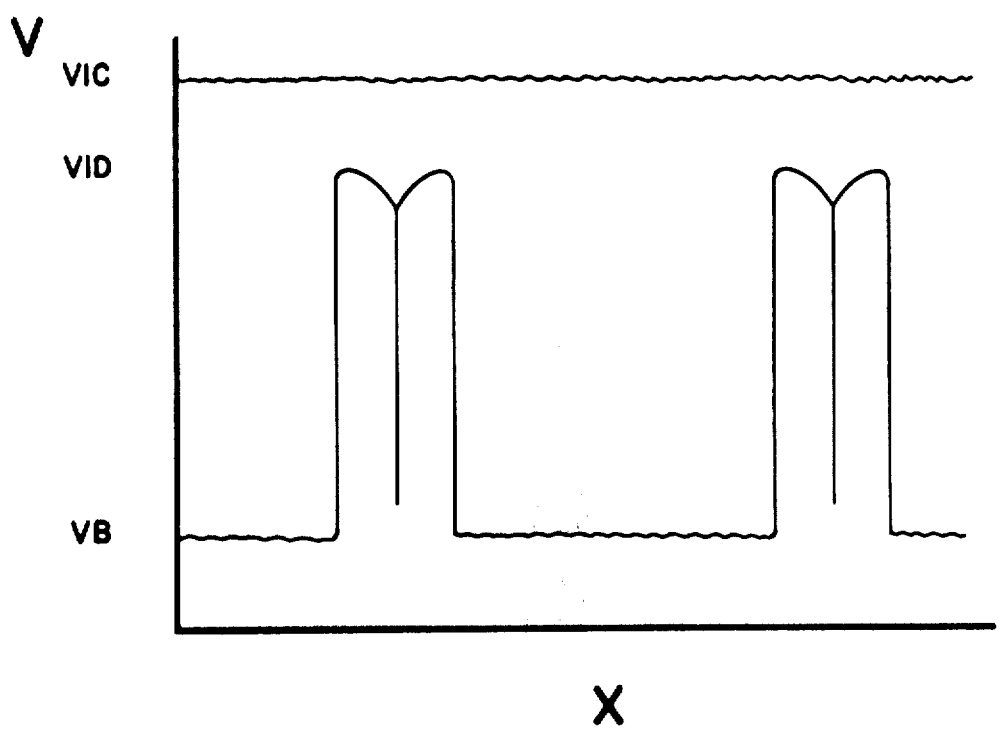
FIG. 2 is a graph showing the charge levels on an exemplary xerographic photoreceptor as illustrated in FIG. 1, specifically the initial charge level, inter-document charge level after dark decay, and background charge level.

FIG. 2 generally illustrates the different photoreceptor voltage levels measured by the electrometer system 10, where $V_{ic}$ represents the initial charge voltage on the photoreceptor at the charging station. $V_{id}$ represents the voltage remaining on the photoreceptor surface in unexposed inter-document areas, measured just prior to development by the electrometer. $V_b$ represents the background voltage level measured just prior to development by the electrometer. The horizontal or X scale represents the movement of the photoreceptor surface past the electrometer probe 20. The difference between $V_{ic}$ and $V_{id}$ represents the dark decay voltage drop previously discussed.

Considering now the circuit 22 illustrated in FIG. 1, it may be seen that when the three function schematic switch 24 is in its "A" position that the probe electrode 28 is directly electrically connected to an input lead 34 of circuit 22. Also in this position the probe electrode 28 is fully exposed through the probe window 30 and not covered by the shutter 32. In all switch positions the probe shield 26 and shutter 32 may be grounded. Thus, the electrostatic field to which the probe electrode 28 is subjected in switch position A is from the charge present on the directly adjacent surface of the photoconductor 12. A corresponding voltage is induced on the probe electrode 28 which is proportional to the internal (shield) capacitance of the probe 20 plus its connected input circuitry relative to the probe to photoconductor capacitance. If this capacitance ratio is about 1,000 to 1, the probe electrode will have an induced voltage thereon of approximately 1/1000 of the photoreceptor surface charge.

The input lead 34 connects through a 10 megohm input protective resistor 36 to one side of a capacitor 38 of 150 picofarads, the opposite side of which is grounded. The capacitor 38 provides storage and transient smoothing of the induced charge on the probe electrode 28, and voltage control by controlling the above-noted capacitance ratio. The capacitor 38 is a very high resistance (low leakage) type such as a commercially available polystyrene capacitor. The full induced voltage stored across the capacitor 38 is continuously applied through a second circuit protecting 10 megohm resistor 40 directly to the gate lead 43 of a metal oxide semiconductor field effect transistor (MOSFET) 42. The input resistors 36 and 40 have no effect on the charge measurement where a conventional output meter is used, since full induced charge will be effectively reached on the capacitor 38 within a fraction of a second after the exposed probe electrode 28 is connected to the input lead 34. The MOSFET 42 is the only active element required in the circuit 22, and the input lead 34 connects only to it and the capacitor 38.

The MOSFET 42 has two resistors 44 and 46 connected respectively to the drain and source leads to form a left leg 48 of a voltage comparator circuit. The resistor 44 here is 4.7K ohms, and the resistor 46 is a variable 5K ohm resistor. The right leg 50 of this voltage comparator circuit comprises a string of resistors 52, 54 and 56. Appropriate resistance values thereof are 2K ohms, 1K ohms and 4.7K ohms, respectively. Resistor 54 has a variable center tap.

Two 7 volt conventional batteries 58 and 60 are applied to both the left and right circuit legs 48 and 50 through a switch 64. This also provides the operating source-to-drain current through the MOSFET 42, which is the same as the left circuit leg 48 current.

The source lead of the MOSFET 42 is connected through the resistor 46 and battery 58 to ground. Thus, the source lead is voltage biased above ground by the battery 58 relative to its gate 43. This bias level provides a more linear operating region for the MOSFET 42, and allows input voltages of either polarity so that the electrometer can measure either positive or negative charges. The resistor 46 also provides negative feedback for improved linearity.

Connecting intermediately between the left and right legs 48 and 50 of the voltage comparator circuit is an output meter 66 in series with a variable calibrating resistor 68 of approximately 50K ohms. This cross-circuit resistance, which is between the drain of the MOSFET 42 and the center tap of the variable resistance 54, is preferably much higher than the total resistance of either of the two legs 48 and 50. Thus, the current drawn through the meter 66 will be relatively small in comparison to the currents in the legs 48 and 50, and will not affect the linearity of the currents and voltages in the left or right legs 48 and 50. Thus, a more linear output is provided by this voltage comparator circuit, which compares the variable output voltage at the drain lead of the MOSFET 42 in the left leg 48 against the fixed reference voltage provided by the settings of the variable resistors 54 and 46. The variable resistor 46 provides a coarse zero adjustment which is set when the unit is manufactured, and the variable resistor 54 provides a fine zero adjustment which is used by the operator during operation to initially zero the meter 66.

The MOSFET 42 has an extremely high input resistance, so that the charge stored on the capacitor 38 and applied to the gate 43 will be discharged as slowly as possible. With a MOSFET 42 of the type specified below, input (gate-to-source) resistances on the order of $10^{14}$ ohms are obtainable typically. It may be seen that this unusually hig gate-to-ground resistance of the MOSFET 42 is the only charge leakage path of significance for the charge applied to the input lead 34. (As previously noted, the low leakage capacitor 38 is the only other connection between the input lead 34 and ground). To further minimize leakage, all of the components of the circuit 22 are preferably mounted on a very high resistance circuit board material such as Teflon.

An appropriate MOSFET 42 has been found to be a 2N4351 silicon N-channel MOS field effect transistor, which was designed for enhancement-mode operation in low power switching applications. This transistor is commercially available at low cost from Motorola Semiconductor Products, Inc., Pheonix, Arizona. The electrical characteristics of the 2N4351 are published in "The Semiconductor Data Book," 5th Ed., Copyright 1970, by Motorola, Incorporated, Semiconductor Products Division, pages 6-770 to 6-773. Such transistors have been previously used in voltage "sample and hold" applications.

It is also desirable that the MOSFET 42 have a fairly low and stable input capacitance. This particular MOSFET input capacitance is only 5 picofarads.

The meter 66 is preferably any conventional volt-ohm-meter which provides full scale meter deflection for a 30 microamp current through the meter. Such test meters are conventionally provided with a direct current measuring mode switch and several different meter scales, preferably including a voltage scale reading 1,500 volts full scale. This type of meter is presently used by Xerox Corporation technical representatives in testing xerographic equipment. The meter 66 preferably has flexible leads which can be removably plugged into conventional plug-in terminals provided in the circuit 22 for the meter 66 connection. Thus, the meter 66 can be separately used for its other conventional functions when it is not connected as the output meter of the electrometer system 10, yet the electrometer system 10 does not have to have a built-in meter. Such test meters conventionally also contain a polarity switch which allows switching of the meter polarity reading without reversing the external leads.

Referring again to the schematic switch 24 of FIG. 1, it may be seen that as soon as the switch 24 is rotated slightly out of the "A" position that the probe electrode 28 is disconnected from the input lead 34 of the circuit 22. The "B" position of the switch 24 is a "hold" or "read" position in which the input lead 34 "floats" and is not connected to either the probe electrode 28 or ground. Thus, whatever charge was last sensed on the electrometer probe 20 as switch 24 is moved from "A" to "B" continues to be held on the capacitor 38 and applied to the input lead 43 of the MOSFET 42. Thus, the "B" switch position enables the operator to quickly manually take and hold a charge measurement at any desired photoconductor area in the "A" position and subsequently read it at leisure in the "B" position. In fact, it has been found that the circuit of the presently described configuration can stably hold a substantially instantaneously measured electrostatic charge and provide a substantially constant output measurement thereof for more than two hours. This unusual ability to rapidly store and then retain over a long time period an input voltage level, and to provide a continuous low impedance output reading thereof, is enabled by the extremely low leakage path of the input circuit retaining the stored charge on the capacitor 38, and by the fact that the MOSFET 42 and its associated circuitry provides a fully isolated low impedance output with a stable, single stage, voltage amplification gain of less than 1. Thus, DC amplifier drift or instability problems associated with many prior such devices are not present in this circuit. The MOSFET 42 is being operated in its active and generally linear "ohmic" operating region, where it operates as a stable voltage controlled variable resistor. Accordingly, oscillators, choppers, clamps, continuously moving shutters, or AC circuits are not required for stable operation. This same stability also enables the electrometer 10 probe to be able to accurately measure different charge levels in the switch 24 "A" position without drift for a long time period after the input is initially zeroed by grounding even though the input is freely floating with respect to ground in the "A" position as well as the "B" position.

The "C" position of the switch 24 of FIG. 1 is utilized for initially zeroing (resetting) the electrometer 10. In this "C" position both the probe electrode 28 and the input lead 34 are grounded. This, of course, grounds the input circuit including capacitor 38 and the input 43 of the MOSFET 42. As will be discussed further, in this same switch position "C" the probe window 30 is rotated under the probe shutter 32 to close it, so that the probe electrode 28 sees only a grounded surface rather than the photoconductive drum 12 or other charged surface. The switch 24 should preferably be maintained in the "C" position when the electrometer is not in use in order to protect the probe electrode 28 and the circuitry 22, and so that any residual charge on the probe or capacitor will be discharged prior to taking a reading. Otherwise, such a residual charge would make the reading erroneous.

In order to properly zero the electrometer 10 prior to taking a reading it is essential that both the probe electrode be grounded and that the probe window be covered by the grounded shutter 32. Grounding the probe electrode and zeroing the meter 66 while the electrode is still exposed to an electrostatic field would cause an erroneous subsequent measurement.

Considering the voltage limiting function of the capacitor 38, as previously noted, the voltage which is applied to the gate 43 of the MOSFET 42 is a function of the ratio of two capacitances, i.e., the photoreceptor to probe electrode capacitance on one hand versus the total probe electrode circuit capacitance on the other hand. This latter capacitance is the sum of the probe electrode to probe shield capacitance plus the fixed capacitance of the capacitor 38, with which it is in parallel, plus the input capacitance of the MOSFET. In the exemplary disclosed circuit the photoreceptor to probe electrode capacitance is about 0.2 picofarads. Of the circuit capacitances, the probe electrode to probe shield capacitance is about 25 picofarads and the MOSFET input capacitance is 5 picofarads, whereas the capacitor 38 here has a capacitance of 150 picofarads. Thus, it may be seen that the capacitor 38 has by far the largest, and the controlling, capacitance in the total circuit capacitance. Therefore, it is the controlling factor in the above-described voltage dividing capacitance ratio. By substantially raising this capacitance ratio the capacitor 38 causes the voltage applied here to the MOSFET gate 43 to be approximately 1/1000th of the photoreceptor surface voltage, rather than 1/125th as it would be if the capacitor 38 were not present. The capacitor 38 substantially lowers the voltage applied to the MOSFET gate (which has a low voltage rating) and, therefore, protects the MOSFET. Even more importantly, it allows the MOSFET to operate over a much smaller input voltage range for a large range of measured photoreceptor charge variations, thereby providing a much more linear output.

Considering now further details of the probe 20, as previously noted, the probe electrode 28, here a conductive linear wire or rod, is mounted coaxially in a tubular metal probe shield 26, which, in turn, is closely but rotatably contained within an outer metal tube 31. The tube 31 here functions to provide the grounded shutter 32 for the probe window 30. In the disclosed configuration the effective probe aperture through which the electrode is exposed is defined by a fixed aperture 70 in the outer tube 31, as may be particularly seen in FIGS. 4–8. The aperture 70 is smaller than the probe window 30 in the probe shield 26. In the "A" position of switch 24 it may be seen that this aperture 70 is aligned over the probe window 30 so that the probe electrode 28 is exposed through the combined aperture.

With a probe shield 26 and tube 31 diameter of both somewhat less than 1 centimeter, an aperture 70 as shown of approximately 2 centimeters in length has proven satisfactory. An aperture 70 width of roughly 100° about the common axis of the two tubes has been found effective, combined with a probe window 30 width in the probe shield 26 of slightly less than 180°. Since the two tubes are concentric and thin walled they have approximately the same internal radius as seen by the probe electrode 28.

To prevent any change or movement in the effective probe aperture during measurement the above-defined size relation is provided, with the aperture opening 70 narrower than the underlying probe window 30. Thus, as the probe shield 26 rotates, there will be no change in the effective probe aperture dimensions or movement until after the switch 24 has moved out of the "A" position and has therefor disconnected the probe electrode 28 from the input lead 34. Thus, the window closing operation of the shutter 32 will not have any effect on the charge reading being taken. The aperture 70 provides a fixed frame for the window 30 and, thus, defines the effective probe aperture whenever the probe electrode is operating.

It will be appreciated, of course, that an alternative construction could be provided with the relative rotation of the two tubes and the size of their apertures interposed and still achieve the same effect. However, the present arrangement is preferred for its mechanical simplicity and ruggedness. Likewise, it will be appreciated that the same probe shuttering operation could be effected by axial movement of the probe shield 26 relative to the outer tube 31 to open and close the probe window 30 and the switch 24 "A" position contacts.

Figure 5:
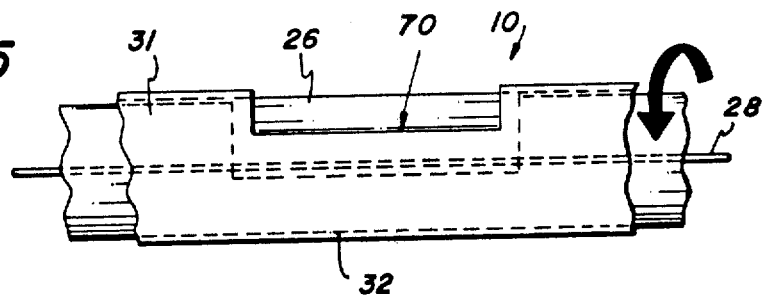
FIG. 5 is a portion of FIG. 4 illustrating the rotation of the probe shield to a closed position.

FIG. 5 illustrates the relative orientation of the two tubular members 26 and 31 when the shutter 32 is closed, i.e., when the switch 24 is in the "C" position as described above. An approximately 180° rotation of the probe shield 26 from the "A" to "C" positions completely closes the probe window 30. The probe window 30 is now fully shuttered by facing an unapertured area of the outer tube 31. Also, in this position the side of the probe shield 26 opposite from the probe window 30 fully closes the aperture 70 in the outer tube 31.

The operation of the shutter 32 is manual and may be done between long time intervals, i.e., it does not have to be rapidly cyclicly opened and closed and may remain in either position for long time periods. Thus, various simple manual shuttering arrangements similar to that disclosed here may be utilized.

Figure 3:
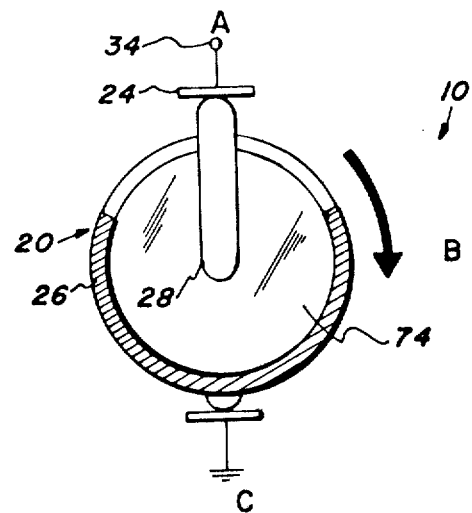
FIG. 3 is a schematic end view of the probe switch of the electrometer of FIG. 1.
Figure 4:
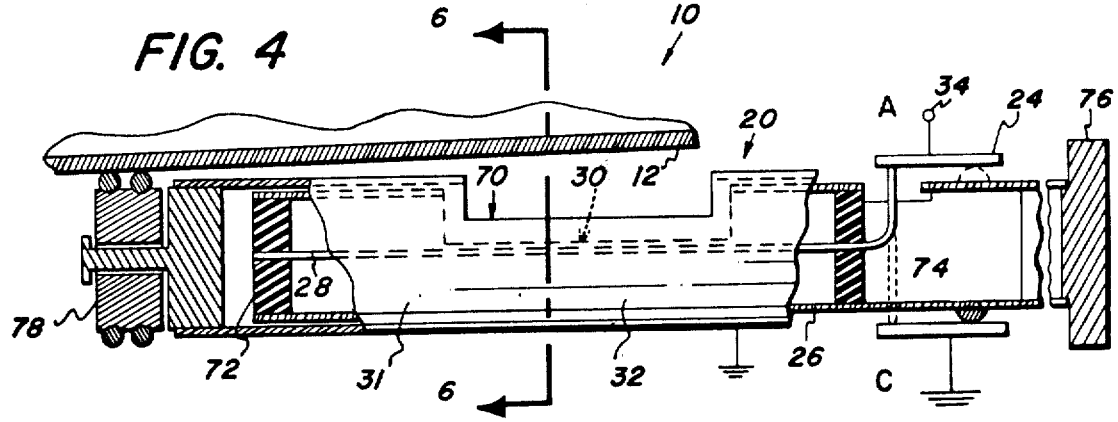
FIG. 4 is a side view, partially in axial cross-section, of the electrometer of FIG. 1, illustrating the probe.

FIGS. 3 and 4 further schematically partially illustrate a simple arrangement for mechanically effecting the schematic switching function 24 illustrated in FIG. 1. It may be seen that the probe electrode 28, a linear rod conductor, is supported axially within the probe shield 26 between highly insulative mounting discs 72 and 74 at each end thereof. Preferably these are made of a very low leakage material such as Teflon. The inner end of the probe electrode 28 is shown bent at right angles outwardly after its termination through the mounting disc 74 to provide the moving contact element for the circuit connection of the probe electrode. This electrode 28 end portion is shown in the "A" switch position, with the "C" position illustrated by a dashed outline.

It may be seen that there is disclosed a very simple structure providing a combined function switch. That is, one simple integral structure associated only with the 3 position rotation of the probe shield 26 accomplishes all of the above-described functioning of the switch 24 as well as the shutter 32. Thus, rotation of a simple external knob 76 (FIGS. 4, 7 and 8) integral the probe shield 26 provides opening and closing of the probe window 30 by the shutter 32 as well as the electrical connection and disconnection of the probe electrode 28 to the input lead 34 and to ground. Specifically, rotation of the knob 76 to the "A" position automatically simultaneously opens the probe window 30 and connects the probe electrode 28 to the input lead 34. Rotation of the knob 76 90° to the "B" position disconnects the electrode 28 from the input lead 34 from any input (thus the orientation of the probe window is irrelevant, although it will be partially closed here). Rotation of the knob 76 another 90° to the "C" position simultaneously and automatically rotates the probe window 30 fully under the grounded shutter 32 and grounds both the probe electrode 28 and the input lead 34.

As an additional feature (not shown) with either rotationally or axially operating probe shutters, conventional spring loading may be provided for automatic return movement of one of the two tubes, so as to automatically maintain the shutter in a normally closed position and the input lead grounded except when measurements are desired to be taken.

Figure 8:
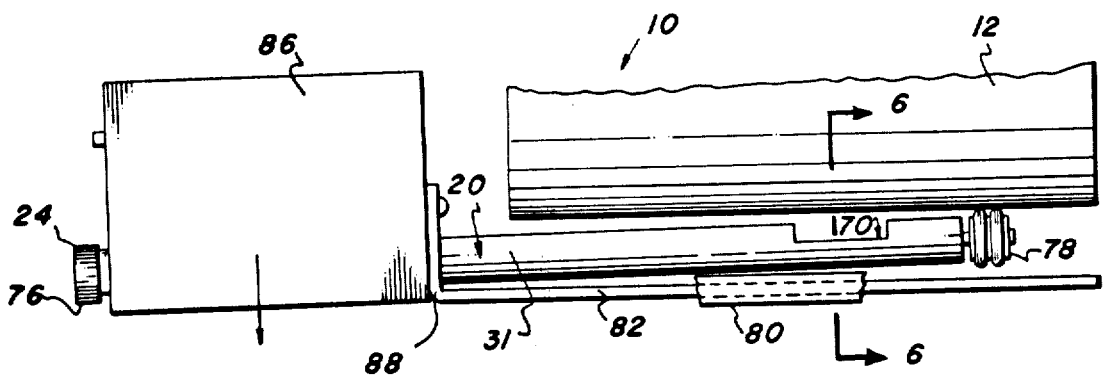
FIG. 8 is a side view of the electrometer of FIG. 1.

Referring now particularly to FIGS. 4 and 8, it may be seen that with the electrometer system 10 that means are provided for spacing the electrometer probe 20 a constant distance from the surface of the photoconductor drum 12. This is provided here by a wheel 78 rotatably mounted at the end of the probe 20 to the outer tube 31. It may be seen that the wheel 78 here comprises a rotatable base, and a pair of conventional rubber O-rings mounted thereon. The O rings provide the outer surface of the wheel 78 contacting the photoconductor 12, and protect the photoreceptor from scratching or other damage by the probe 20. They also prevent discharge of the charge on the contacted surface. The wheel 78 freely rotates on the surface of the photoconductor 12 as the photoconductor moves past the probe. The wheel 78 is concentric with the axis of the probe and the probe electrode and maintains a constant spacing of the probe closely adjacent to the photoconductor surface.

Since the probe is mounted generally parallel to the photoreceptor surface the probe window 30 may be located at any desired position along the probe shield 26 for viewing any desired portion of the photoconductor, although it is preferably adjacent the spacing wheel 78. The elongated probe itself may be moved transversely with respect to the direction of motion of the photoconductor to position the probe window over the area of the photoreceptor to be measured.

It will be appreciated that other spacing means may be utilized for maintaining a constant spacing. However, it may be seen that this disclosed system is both direct and simple and does not depend, for example, on a critical alignment of a bracket adjacent the photoreceptor. It will compensate for "runout" or other eccentric movement of the photoreceptor automatically.

It has been found appropriate to provide an approximately 0.5 centimeter spacing between the probe electrode 28 and the photoconductor surface directly above the electrode with the disclosed structure, maintained by the wheel 78. With this spacing, and with a surface voltage of 400 volts, the spatial sensitivity of the probe electrode 28 is approximately 40 volts per millimeter (1 volt per 0.001 inches). That is, for a constant surface charge, this is the observed change in output (loss of calibration) that will occur for this change in the spacing of the probe electrode. However, in xerographic machine control a 10 volt surface measurement error would not normally be significant. Thus, the disclosed structure is quite adequate for maintaining a sufficiently constant spacing from the charged surface, especially since the total wheel diameter 78 is here only on the order of 1 centimeter. However, a constant pressure between the wheel 78 and the photoreceptor surface is desirable in order to insure a light and constant deformation of the resilient outer surface of the wheel 78, and therefor a constant spacing. This is provided by the spring mounted and gravity loaded wheel applying structure described here directly below. Also the O rings are preferably readily replaceable to insure that wear or damage does not affect the concentricity of the wheel 78.

Figure 6:
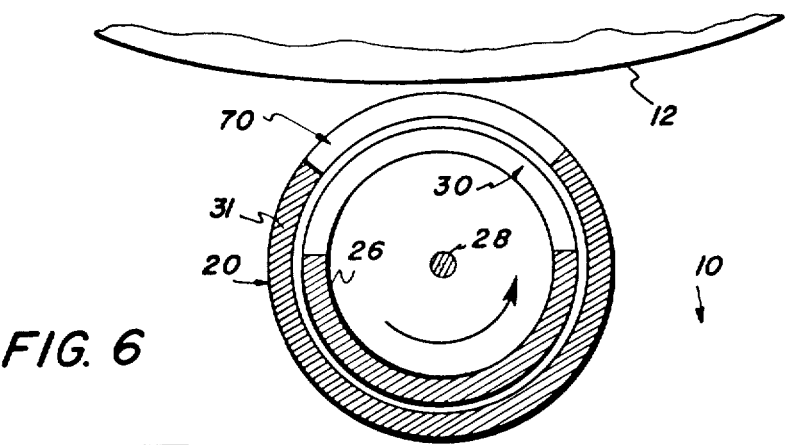
FIG. 6 is a cross-sectional view taken along the line 6—6 of FIG. 4, and 6—6 of FIG. 8.
Figure 7:
FIG. 7 is a top view of the electrometer of FIG. 1 showing a mechanical mounting configuration.
Figure 7:
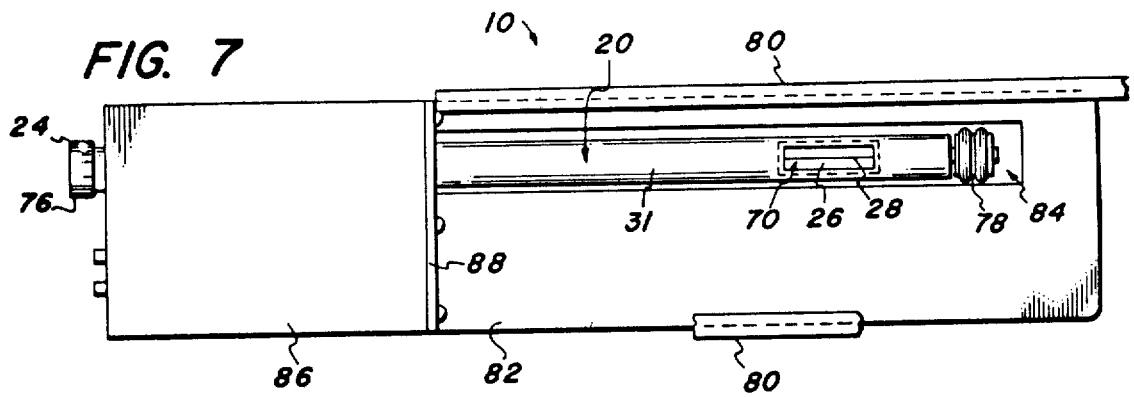

Considering now FIGS. 6–8, there is shown a mounting arrangement for the electrometer system 10, particularly suited for its operation in a Xerox Corporation "4000" copier. This copier contains an existing spaced pair of fixed mounting tracks 80 which are both spaced by about 1 centimeter from the photoreceptor surface, directly adjacent the developer station 18 and following the exposure station 16. These tracks 80 normally provide the mounting for an electroluminescent panel utilized in the "4000" copier for the inter-document (pitch) fade-out lamp, which discharges the photoreceptor in what would otherwise be the unexposed areas between the document exposure areas. This electroluminescent panel is easily slid out of the opposing mounting grooves in the tracks 80, leaving the tracks 80 free to provide a mounting for the electrometer system 10. They extend fully across the direction of motion of the photoreceptor, parallel thereto. The entire electrometer is then mounted in the machine for use by sliding a mounting plate 82 of the electrometer directly into the same tracks 80.

The mounting arrangement here comprises an integral mounting plate 82 having the same general dimensions as the electroluminescent panel and adapted to slide mount directly into the tracks 80. It may be seen that this mounting plate 82 comprises an elongated, generally rectangular and thin sheet metal plate. It has a correspondingly elongated aperture 84 therein which is somewhat larger than the dimensions of the electrometer probe 20, and contains it. The mounting plate 82, thus, extends on both sides of the probe 20 to provide mechanical protection for it, but does not interfere with its operation either electrically or mechanically.

All of the other components of the electrometer system 10 (with the exception of the meter 66, which is plugged in as described above) are contained in a chassis box 86 from which the probe 20 extends. The chassis box 86 is mounted solely by being secured to a right angled lip 88 formed in the outside end of the mounting plate 82. The electrometer may be inserted in the tracks 80 up to, but not beyond, the lip 88. When the mounting plate 82 is slid into the tracks 80 it is held substantially co-planarly therein over its inserted portion, but the chassis box and probe are not. The chassis box 86 extends beyond the end of the mounting tracks 80. This cantilever extension of the chassis box 86 allows its weight to somewhat deform the outer end of the mounting plate 82 at the lip 88. That is, the mounting plate 82 at the lip 88 intersection provides a resilient spring hinge pivot allowing limited downward movement of chassis box 86, although supporting a portion of its weight. The outside end of the probe 20, particularly the outer tube 31, is rigidly mounted to the chassis box 86. Accordingly, when the weight of the chassis box 86 is allowed to deflect itself downwardly, the inside end of the probe 20 containing the wheel 78 is correspondingly pivoted upwardly out of the aperture 84 and into contact with the photoconductor surface 12. Since the weight of the chassis box 86 and the spring force of the mounting plate 82 are substantially constant it may be seen that the engagement force of the wheel 78 with the photoreceptor surface resulting therefrom is also constant. Further, the elongated nature of the probe 20 provides a long lever arm for further reducing and evening this engagement force. Thus, it may be seen that a simple, non-critical, but effective mounting structure is provided for both properly positioning the electrometer and achieving the desired constant force engagement between the probe spacing wheel 78 and the photoreceptor surface 12. A stop member of the probe may be provided extending over the plate 82 to prevent the plate 82 from deflecting above rather than below the probe for any reason, if desired.

It will be noted that the probe 20 and its aperture 84 in the mounting plate 82 are located closer to one edge of the mounting plate 82 than the other, i.e., off-center. Due to the curvature of the photoreceptor drum, this arrangement provides somewhat increased available space under the photoreceptor surface for the probe 20 between the tracks 80.

While the above-described mounting arrangement is particularly suited and adapted for use in a Xerox "4000" machine inter-document lamp mounting, it will be appreciated that this mounting in no way impedes utility of the electrometer system 10 for other measurements. For example, the entire electrometer unit can be hand held and the wheel 78 pressed against any desired charged surface, such as paper moving into the output tray of a xerographic machine. The opened window of the probe must, of course, be facing the surface to be measured. The planar mounting plate 82, since it extends only at right angles to the probe window, does not interfere with the measurement in any way, and in fact assists in aligning the window perpendicular the charged surface and protecting the probe. The unusually long, thin nature of the probe enables charge measurements to be taken over wide areas, as across the entire photoreceptor, yet occupy only a small pencil shaped volume. Thus, it may be readily inserted between closely spaced components.

Considering now the use and operation of the electrometer system 10, the initial calibration of the electrometer will be described first. Calibration involves only the setting of the variable resistor 68 shown adjacent the meter 66 in the schematic circuit of FIG. 1. This calibration need not be done each time the electrometer is utilized since the calibration remains quite stable with this circuitry. Of course, if the probe to photoreceptor spacing is changed, as by changing the O rings on the wheels 78, the electrometer should be recalibrated. Calibration involves simply placing the probe wheel 78 against a surface having a known charge and adjusting the variable resistor 68 until the meter 66 reads the known charge on its voltage scale. This can be accomplished readily in a xerographic apparatus by removing the photoreceptor drum and replacing it with a conventional "bare plate" test structure, which fits on the drum shaft and is presently utilized in corotron output current measurements. This bare plate metal surface, which has approximately the same radius as the photoreceptor surface, is placed over the electrometer probe mounting location. A known high voltage is then applied directly to this bare plate from one of the supplies of the xerographic machine to provide the known surface charge for calibration.

Prior to calibration, and for each measurement operation thereafter when necessary, the output meter 66 or other output indicator of the measured voltage should be zeroed. This zeroing operation can be accomplished either in or out of the installation in the xerographic machine. The knob 76 is turned to the schematic switch 24 "C" position. As previously described this accomplishes both the closing of the probe aperture window by the grounded shutter and the grounding of both the probe electrode and the input lead of the electrometer circuit. While these elements are thus grounded and shielded the variable potentiometer 54 is adjusted, if necessary, for a zero reading on the meter 66 or other output indicator.

The next step by the operator is to take the charge reading to obtain the desired measurement. This is accomplished with the electrometer probe installed in the desired area and the spacing held constant with the photoreceptor as previously described. Thus, for the particular mounting arrangement in FIGS. 6–8, for example, the electrometer unit should not be handled and should be undisturbed to maintain the proper constant contact pressure. The xerographic machine can be turned on and running since the electrometer unit does not affect its operation in any way, except that the inter-document areas will not be discharged since the inter-document lamp has been removed. Accordingly, the voltage present on the photoconductor surface will fluctuate as shown in FIG. 2.

The knob 76 may then be rotated to the read position, i.e., switch 24 position "A," so that the probe electrode 28 is unshielded and connected to the input of the circuit 22. The operator will then see the needle of the output meter 66 fluctuate between two measured voltage levels; the high voltage level of the undischarged or inter-document areas and the lower voltage level of the background or document areas. For a relatively slow-moving photoreceptor these meter fluctuations will be slow enough so that the operator can simply read the two levels as they occur. However, for a more rapidly moving photoreceptor the fluctuations between the inter-document and background voltage levels will be too rapid for convenient reading by the operator with a conventional meter. Accordingly, the operator will select one of these levels to read at a time.

One way that the inter-document voltage, or more specifically, the voltage on the photoreceptor just before development without light discharge (the initial charge) voltage minus dark decay) can be made continuous is by disabling the exposure lamp. In that case the entire photoreceptor is undischarged and the output will then be constant. This can be accomplished in various ways, such as by blocking the exposure slit, pulling out the lamp relay, using a black image on the document platen scanned by the exposure lamp, installing a lens cap, etc. Disabling the exposure lamp also eliminates the brief (spike) drop shown in FIG. 2 in the inter-document voltage level, which is due to a brief drum exposure in the retrace (rapid return) of the document lamp.

This inter-document or dark voltage can also be measured continuously without disabling the exposure lamp simply by the operator quickly turning the knob 76 to the hold and read position "B" of switch 24 when the probe is over the inter-document area. He may sense this by watching the output meter level.

Position "B," as previously described, disconnects the probe electrode 28 and retains the last charge imposed thereon in the input circuitry across the capacitor 38 for a long time period, limited only by the low leakage of the input circuitry. Thus, this voltage may be subsequently read by the operator at leisure since it is stably stored thereon for a long time period and not affected by any subsequent change in the photoreceptor voltage.

The same store and read switch function B may be utilized in the same manner to measure the background voltage. The switch 24 is turned back to position "A" and the output meter observed for the lower, i.e., background, voltage. When this occurs the switch 24 is then switched again to the hold position "B" and the background voltage may be read at leisure by the operator without fluctuations. It will be appreciated, of course, that for a proper background voltage reading that the white platen cover or a white document should be preferably placed on the document platen to provide even background exposure over the entire document exposure area of the drum.

The different time periods for the inter-document and background exposure areas can also be detected by the operator by watching the exposure lamp or inter-document lamp go on and off and using that as the cue to switch the switch 24 from the "A" to "B" position as described.

With the accurate charge readings provided for both the dark and light image areas by the above measurements, the operator can proceed to detect various machine malfunctions, or to properly adjust various desired machine components such as supply voltages, to achieve the optimum charging voltage, illumination, developer bias voltage, etc. Since the machine is in its operating condition the copy quality can also be observed during the testing period.

Although manual control of existing xerographic machine adjustments by the operator is discussed here, it will be obvious that various of these controls can be made automatic, utilizing a more permanently installed electrometer, if desired. Examples of such control arrangements are discussed, for example, in the previously cited U.S. Pat. Nos. 2,956,487 to E. C. Giaimo and 3,611,982 to S. Coriale, and others. The output of the electrometer system 10 is particularly suitable for such controls, as discussed above. The actuation in proper time sequence of the switch 24 and the shutter 32 can be readily accomplished, for example, by means of a simple rotary solenoid connecting at the knob 76 location and controlled by the existing machine logic.

The electrometer system 10 can also be adapted to make a "balancing" test of the charging or illumination station, i.e., to test for unbalance or variations of the charge and discharge from one side of the photoreceptor to the other. This requires, of course, movement of the probe window to different positions transversely across the photoreceptor and taking readings at these different positions.

It will be appreciated that the above-described means for maintaining a constant physical spacing of the probe electrode from the charged surface to be measured is required because the electrometer 10 disclosed is a simple non-feedback DC system with the probe shield grounded. However, as was previously noted in connection with various of the above-described references, nulling or balancing type electrometers are well known, in which a feedback circuit is provided to feed back the measured voltage to the probe to null the electrometer electrode and thereby make it spatially insensitive.

Referring to FIG. 1, it may be seen that the circuit 22 output of the drain of the MOSFET 42, which may be taken off at the taps "D," for example, provides an output voltage directly proportional to the voltage sensed by the electrometer probe 28, although at a much lower voltage level. Thus, by simply disconnecting the probe shield 26 from ground and connecting an appropriate high gain and high voltage output amplifier from taps "D" to the probe shield 26, to balance out the electrostatic field sensed by the electrometer probe 28, a nulling type electrometer can be provided which will be substantially insensitive to the spacing of the electrometer probe from the surface to be measured. Then the wheel 78 or other mechanical probe spacing means would not be required. This feedback or nulling amplifier can be a relatively simple low power DC voltage amplifier, without critical stability or drift problems, because the amplifier input from the taps "D" is stable, has a relatively low impedance, and is substantially fully isolated from the probe electrode input circuitry as previously discussed. The amplifier could conventionally automatically feed back voltage to the probe shield until the output at tap "D" reached zero, indicating that the probe shield was at essentially the same voltage level and polarity as the surface being measured, and that therefor the probe electrode was not subjected to any induced voltage. Alternatively, if it were desired to keep the probe shield 26 grounded, the nulling could be accomplished by using instead a second electrode installed within the shield 26 spaced behind the electrode 28, which electrode would be connected to the output of the voltage feedback amplifier instead, to apply the balancing voltage for the probe electrode to this second electrode.

It will be appreciated that with such nulling or balancing type electrometer systems described above that the output could not be read at the taps "D," since that output point would be being driven toward zero by the effect of the feedback voltage on the probe electrode. However, the output can be conventionally read by reading the feedback voltage level at the output of the feedback amplifier, or internally of this amplifier, since this voltage will be essentially the same as the voltage on the surface to be measured.

In conclusion, it may be seen that there has been disclosed herein a novel and improved electrometer system particularly suited for simple and low cost measurements of the surface charges in electrostatographic apparatus. While the exemplary embodiments described herein are presently considered to be preferred, it is contemplated that numerous further variations and modifications within the purview of those skilled in the art can be made herein. Thus, for example, the present invention is not intended to be limited to the specific circuit components and values and structures disclosed herein where other operative equivalents can be provided. The following claims are intended to cover all such variations and modifications as fall within the true spirit and scope of the invention.

What is claimed is:

1. In an electrometer system for non-contact detection of the electrostatic charge on a moving electrostatographic imaging surface in an electrostatographic apparatus, including an electrometer probe adapted to be held adjacent said surface and containing a probe electrode, and an electrometer circuit providing an output signal corresponding to a charge induced on said probe electrode, the improvement wherein:

said electrometer probe comprises a thin elongated extended conductive tube containing said probe electrode therein and having a probe window for exposing said probe electrode in a side of said tube adjacent said imaging surface, said electrometer system further including protective mounting means connected thereto and extending along both sides of said probe, said mounting means having mounting edges slidably mounting said electrometer system into said electrostatographic apparatus.

2. The electrometer system of claim 1, wherein said electrometer system is flexibly cantilever mounted in said electrostatographic apparatus from said mounting means.

3. The electrometer system of claim 1 wherein said electrostatographic apparatus is a xerographic apparatus with a photoreceptor comprising said imaging surface and a development station and having parallel mounting tracks for a pre-development inter-document lamp closely adjacent said photoreceptor and said development station, wherein said mounting means is slidably mounted into said mounting tracks to mount said probe adjacent said photoreceptor.

4. The electrometer system of claim 3 wherein said electrometer system is flexibly cantilever mounted in said mounting tracks from said mounting means.

5. The electrometer system of claim 3 further including a chassis box resiliently cantilever mounted to one end of said mounting means and extending outside of said mounting tracks, said probe being fixed to and movable with said chassis box, said chassis box pivoting by gravity with respect to said mounting member to hold said probe closely adjacent said photoreceptor.

6. The electrometer system of claim 6 further including insulated wheel means rotatably mounted to said probe coaxially with said probe electrode, said wheel means having a diameter slightly larger than said probe, said wheel means being adapted to be rolled against said photoreceptor to maintain a constant spacing of said probe electrode from said photoreceptor at said probe window.

7. The electrometer system of claim 6 wherein said wheel means has a resilient surface protective insulative surface.

* * * * *